United States Patent
Chu (10) Patent No.: US 9,445,073 B2
(45) Date of Patent: Sep. 13, 2016

(54) IMAGE PROCESSING METHODS AND SYSTEMS IN ACCORDANCE WITH DEPTH INFORMATION

(71) Applicant: HTC Corporation, Taoyuan County (TW)

(72) Inventor: Lun-Cheng Chu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 384 days.

(21) Appl. No.: 13/959,753

(22) Filed: Aug. 6, 2013

(65) Prior Publication Data

US 2015/0042760 A1  Feb. 12, 2015

(51) Int. Cl.
*H04N 13/00* (2006.01)

(52) U.S. Cl.
CPC ................ *H04N 13/0018* (2013.01)

(58) Field of Classification Search
CPC ................................. H04N 13/0018
See application file for complete search history.

(56) References Cited

U.S. PATENT DOCUMENTS

| 9,104,293 | B1* | 8/2015 | Kornfeld | G06F 3/04817 |
| 2010/0289819 | A1* | 11/2010 | Singh | G09G 3/003 |
| | | | | 345/619 |
| 2011/0102553 | A1* | 5/2011 | Corcoran | G06K 9/00281 |
| | | | | 348/50 |
| 2012/0249836 | A1* | 10/2012 | Ali | G06T 5/003 |
| | | | | 348/239 |

FOREIGN PATENT DOCUMENTS

| CN | 1287646 A | 3/2001 |
| CN | 102984530 A | 3/2013 |
| TW | 201312249 A | 3/2013 |
| TW | 201331693 A | 8/2013 |

OTHER PUBLICATIONS

Corresponding Taiwanese Office Action that these art references were cited on Nov. 11, 2015.
Corresponding Chinese Office Action that these art references were cited on Dec. 17, 2015.

* cited by examiner

*Primary Examiner* — Maurice L McDowell, Jr.
(74) *Attorney, Agent, or Firm* — CKC & Partners Co., Ltd.

(57) ABSTRACT

Image processing methods and systems in accordance with depth information are provided. At least one image with depth information is obtained. The image is displayed on a display unit of an electronic device. A selection of an ROI (Region Of Interest) in the image is received via a user interface. A first depth value corresponding to the selected ROI is obtained from the depth information, and the first depth value is mapped to a first effect level of an image effect, wherein the image effect has a plurality of effect levels. The image effect is applied to the image according to the depth information of the image, wherein the selected ROI is applied with the image effect in the first effect level.

15 Claims, 6 Drawing Sheets

IMAGE PROCESSING METHODS AND SYSTEMS IN ACCORDANCE WITH DEPTH INFORMATION

BACKGROUND OF THE INVENTION

1. Field of the Invention

The disclosure relates generally to image processing methods and systems, and, more particularly to image processing methods and systems in accordance with depth information.

2. Description of the Related Art

Recently, portable devices, such as handheld devices, have become more and more technically advanced and multifunctional. For example, a handheld device may have telecommunications capabilities, e-mail message capabilities, an advanced address book management system, a media playback system, and various other functions. Additionally, most handheld devices may be equipped with an image capture unit for capturing images. For example, users can take photos using the camera set on the handheld device. Due to increased convenience and functions of the devices, these devices have become necessities of life.

Currently, the 3D content industry has grown due to application and growth in multimedia systems, computer gaming, 3D TV broadcasting systems, and others. With the development of 3D content, the image capture unit of the device may be a dual-camera. Dual-camera is a device that can provide two different points of a view at the same time, therefore the same object will produce two different geometry views to the two captured images. The distance of an object from the photographer can be measured by analyzing the difference of the left and right images. The measurement result is the depth map, which indicates the depth (distance between object and photographer) of each pixel in the image. With the depth information of the image, the image can be viewed with a 3D effect as real world.

In the handheld devices, some simple image effects, such as adding a specific frame can be applied to the image captured by the image capture unit. However, when users want to add other image effects to the captured image, users must first use the handheld device to capture an image, and transmit the image from the handheld device to a computer. Then, image editing software can be operated in the computer to process the image, such that related image effects can be added to the image. Above image processing operations for images captured by the handheld devices require related operational knowledge and many manual operations. The required operations are time-consuming and inconvenient for users

BRIEF SUMMARY OF THE INVENTION

Image processing methods and systems in accordance with depth information are provided.

In an embodiment of an image processing method in accordance with depth information, at least one image with depth information is obtained. The image is displayed on a display unit of an electronic device. A selection of an ROI (Region Of Interest) in the image is received via a user interface. A first depth value corresponding to the selected ROI is obtained from the depth information, and the first depth value is mapped to a first effect level of an image effect, wherein the image effect has a plurality of effect levels. The image effect is applied to the image according to the depth information of the image, wherein the selected ROI is applied with the image effect in the first effect level.

In an embodiment of an image processing method in accordance with depth information, at least one image with depth information is obtained. An image effect is provided, wherein the image effect has a plurality of effect levels. The image effect is applied to the image according to the depth information of the image, wherein respective pixels of the image are applied with the image effect in various effect levels based on respective depth values corresponding to the respective pixels.

An embodiment of an image processing system in accordance with depth information includes a storage unit, a display unit, and a processing unit. The storage unit includes at least one image with depth information. The processing unit obtains the image with depth information, and displays the image via the display unit. The processing unit receives a selection of an ROI in the image via a user interface. The processing unit obtains a first depth value corresponding to the selected ROI from the depth information, maps the first depth value to a first effect level of an image effect, wherein the image elect has a plurality of effect levels, and applies the image elect to the image according to the depth information of the image, wherein the selected ROI is applied with the image effect in the first effect level.

In some embodiments, the at least one image includes a left image and a right image, which are captured via a dual-camera, and the depth information is calculated according to the left image and the right image.

In some embodiments, the display unit is a touch-sensitive display unit, the user interface is displayed on the touch-sensitive display unit, and the selection of the ROI is received via the touch-sensitive display unit.

In some embodiments, a second depth value corresponding to at least one pixel except the selected ROI in the image is obtained from the depth information, wherein the second depth value and the first depth value are different. The second depth value is mapped to a second effect level of the image effect, wherein the second effect level and the first elect level are different. When the image effect is applied to the image, the pixel is applied with the image effect in the second effect level. In some embodiments, a difference between the first depth value and the second depth value is calculated, and the second depth value is mapped to the second effect level of the image effect based on the first effect level and the difference.

Image processing methods in accordance with depth information may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Image processing methods and systems in accordance with depth information are provided.

Figure 1:
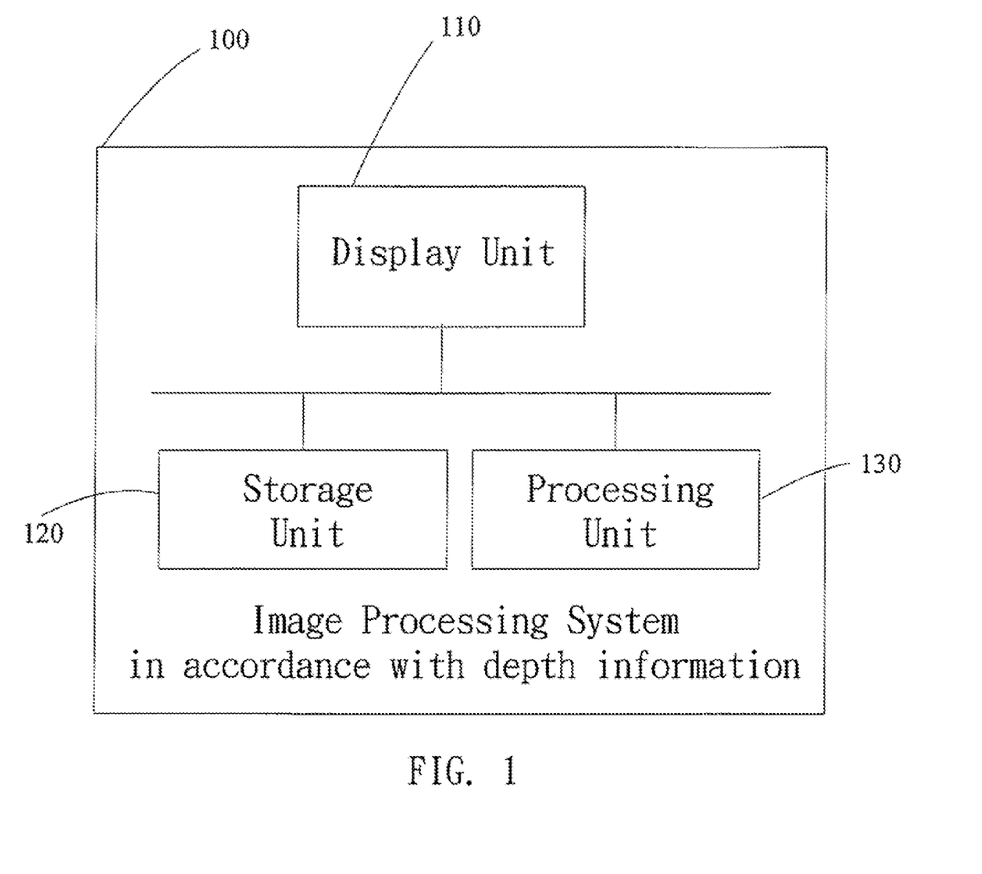
FIG. 1 is a schematic diagram illustrating an embodiment of an image processing system in accordance with depth information of the invention.

FIG. 1 is a schematic diagram illustrating an embodiment of an image processing system in accordance with depth information of the invention. The image processing system in accordance with depth information 100 can be used in an electronic device, such as handheld devices such as a PDA (Personal Digital Assistant), a smart phone, a mobile phone, an MID (Mobile Internet Device, MID), a Netbook, or a GPS (Global Positioning System).

The image processing system in accordance with depth information 100 comprises a display unit 110, a storage unit 120, and a processing unit 130. It is understood that, in some embodiments, the image processing system in accordance with depth information 100 can also comprise an image capture unit (not shown in FIG. 1). It is noted that, the image processing system in accordance with depth information 100 with the image capture unit may be an electronic device having image capture capability, such as a digital camera, or a picture-taking handheld device. The image capture unit may be a CCD (Charge Coupled Device) or a CMOS (Complementary Metal-Oxide Semiconductor), placed at the imaging position for objects inside the electronic device. It is understood that, in some embodiments, the image capture unit may be a dual-camera, which can simultaneously capture a left image and a right image. The left and right images can be used to compose a 3D image. The display unit 110 can display related figures and interfaces, and related data, such as the preview images continuously captured by the image capture unit, and the image captured by the image capture unit during a photography process. It is noted that, the preview image is not actually stored in the storage unit 120. It is understood that, in some embodiments, the display unit 110 may be a screen integrated with a touch-sensitive device (not shown). The touch-sensitive device has a touch-sensitive surface comprising sensors in at least one dimension to detect contact and movement of an input tool, such as a stylus or finger on the touch-sensitive surface. That is, users can directly input related data via the display unit 110. It is understood that, the image data captured by the image capture unit can be permanently or temporarily stored in the storage unit 120, which may be a built-in memory, or an external memory card of the image processing system in accordance with depth information 100. The processing, unit 130 can control related components of the image processing system in accordance with depth information 100, process the preview images continuously captured by the imago capture unit, and/or the image captured by the image capture unit during the photography process, and perform the image processing methods in accordance with depth information of the invention, which will be discussed further in the following paragraphs. It is noted that, the image processing system in accordance with depth information 100 can further comprise a focus unit (not shown in FIG. 1). The processing unit 130 can control the focus unit to perform a focus process for at least one object during a photography process.

Figure 2:
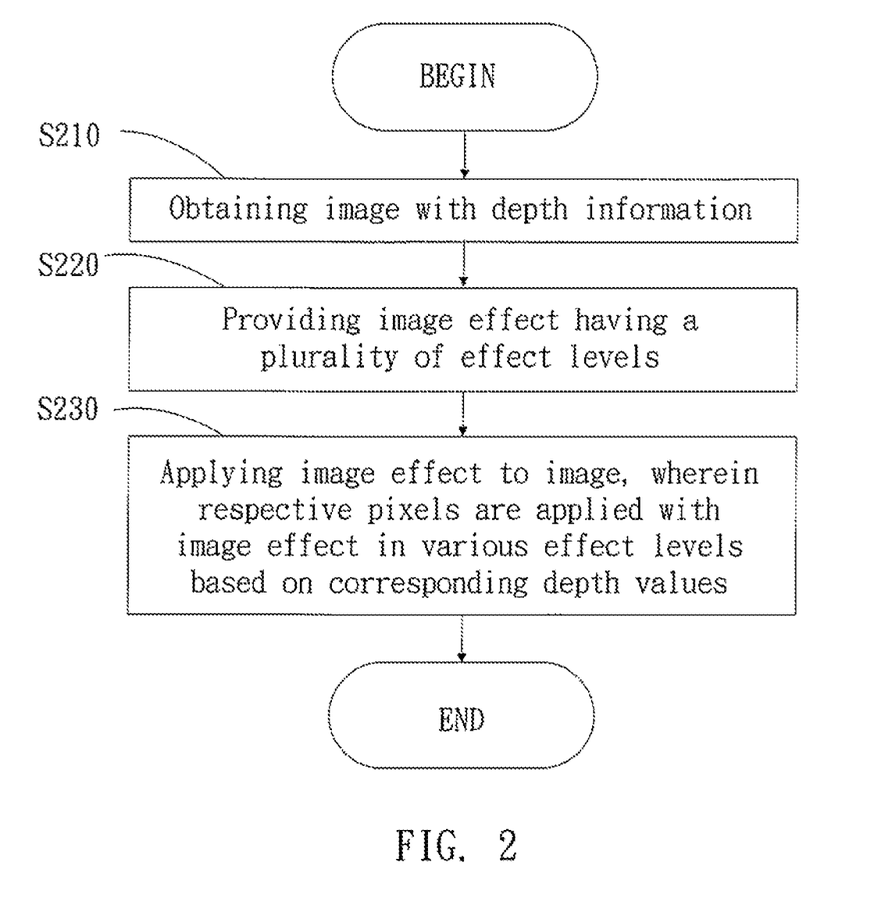
FIG. 2 is a flowchart of an embodiment of an image processing method in accordance with depth information of the invention.

FIG. 2 is a flowchart of an embodiment of an image processing method in accordance with depth information of the invention. The image processing method in accordance with depth information can be used in an electronic device, such as handheld devices such as a PDA (Personal Digital Assistant), a smart phone, a mobile phone, an MID (Mobile Internet Device, MID), a Netbook, or a GPS (Global Positioning System).

In step S210, at least one image with depth information is obtained. It is understood that, in some embodiments, the image and the corresponding depth information can be stored in the electronic device in advance. The depth information records depth values for respective pixels in the image. In some embodiments, the electronic device may have an image capture unit, such as a dual-camera, which can capture a left image and a right image. The depth information of the image can be calculated according to the left image and the right image. In step S220, at least one image effect is provided. It is understood that, in some embodiments, the electronic device may provide a plurality of image effects, and at least one of the image effects can be selected for use. It is noted that, the image effect may have a plurality of effect levels. For example, in an image blur effect, a pixel applied with the image blur effect in a first effect level may be clear than another pixel applied with the image blur effect in a second effect level. In step S230, the image effect is applied to the image according to the depth information of the image, wherein respective pixels of the image are applied with the image effect in various effect levels based on respective depth values corresponding to the respective pixels. It is understood that, each depth value can map to a specific effect level. In some embodiments, the mapping relationship between the depth value and the effect level can be predefined. In some embodiments, a specific depth value can be first set to a predefined effect level, and other depth values can be mapped to specific effect levels based on the predefined effect level and the difference from itself to the specific depth value.

Figure 3:
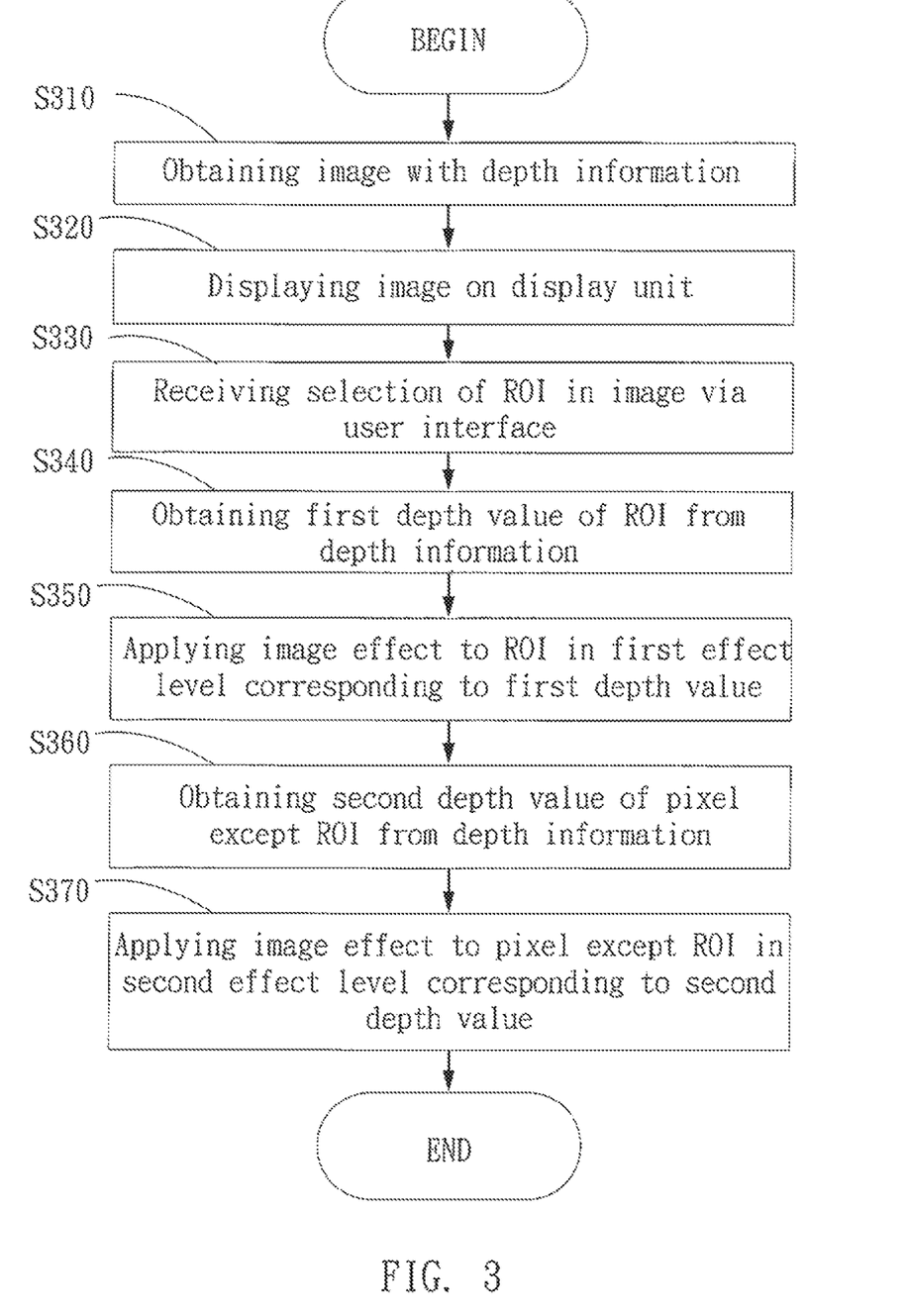
FIG. 3 is a flowchart of another embodiment of an image processing method in accordance with depth information of the invention.

FIG. 3 is a flowchart of another embodiment of an image processing method in accordance with depth information of the invention. The image processing method in accordance with depth information can be used in an electronic device, such as handheld devices such as a PDA (Personal Digital Assistant), a smart phone, a mobile phone, an MID (Mobile Internet Device, MID), a Netbook, or a GPS (Global Positioning System).

In step S310, at least one image with depth information is obtained. Similarly, in some embodiments, the image and the corresponding depth information can be stored in the electronic device in advance. The depth information records depth values for respective pixels in the image. In some embodiments, the electronic device may have an image capture unit, such as a dual-camera, which can capture a left image and a right image. The depth information of the image can be calculated according to the left image and the right image. In step S320, the image is displayed on the display unit of the electronic device. In step S330, a selection of an ROI (Region Of interest) in the image is received via a user interface. It is understood that, in some embodiments, the display unit may be a touch-sensitive display unit for displaying the user interface. User can directly use an input tool, such as a stylus or finger to select the ROI via the touch-sensitive display unit. When the ROI in the image is selected, in step S340, a first depth value corresponding to the selected ROI is obtained from the depth information. It is noted that, the ROI includes at least one pixel. The first depth value is corresponded to the pixel in the ROI. In step S350, the first depth value is mapped to a first effect level of an image effect, and the selected ROI is applied with the image effect in the first effect level. It is understood that, in some embodiments, the electronic device may provide a plurality of image effects, and at least one of the image effects can be selected for use. It is noted that, the image effect may have a plurality of effect levels. In step S360, a second depth value corresponding to at least one pixel except the selected ROI in the image is obtained from the depth information. It is understood that, in some embodiments, the second depth value and the first depth value may be different. In step S370, the second depth value is mapped to a second effect level of the image effect, and the pixel is applied with the image effect in the second effect level. It is understood that, in some embodiments, the second effect level and the first effect level may be different. It is noted that, the depth value of the respective pixel in the image can be obtained from the depth information, and a corresponding effect level of the image effect can be accordingly mapped. Then, the respective pixel can be applied with the image effect in the mapped effect level. For example, in some embodiments, the image effect may be an image blur effect, and the selected ROI applied with the first effect level of the image is clear than the pixel applied with the second effect level of the image. In some embodiments, the image effect may be an image gray effect, and the selected ROI applied with the first effect level of the image is gray than the pixel applied with the second effect level of the image. Similarly, each depth value can map to a specific effect level. In some embodiments, the mapping relationship between the depth value and the effect level can be predefined. In some embodiments, a specific depth value can be first set to a predefined effect level, and other depth values can be mapped to specific effect levels based on the predefined effect level and the difference from itself to the specific depth value.

Figure 4:
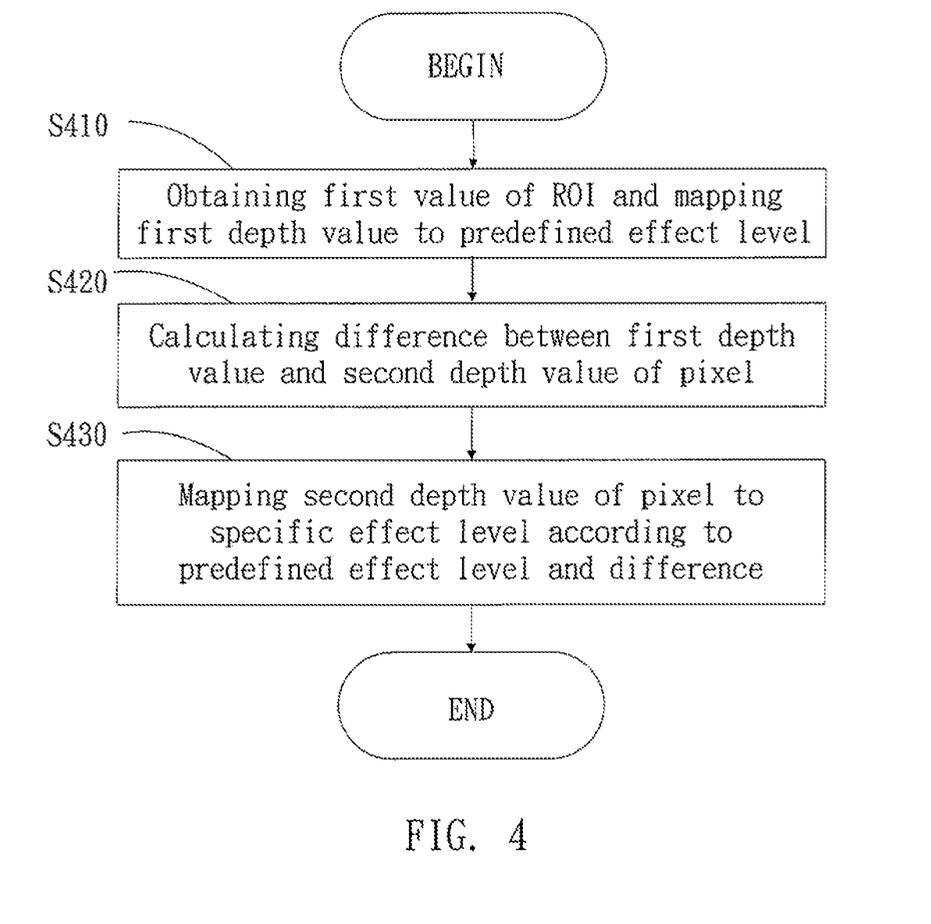
FIG. 4 is a flowchart of an embodiment of method for determining an effect level for a depth value of a respective pixel in the image except the ROI of the invention.

FIG. 4 is a flowchart of an embodiment of method for determining an effect level for a depth value of a respective pixel in the image except the ROI of the invention. In the embodiment, an ROI is selected in the image.

In step S410, a first depth value corresponding to the selected ROI is obtained from the depth information, and the first depth value is mapped to a predefined effect level of an image effect. Similarly, the ROI includes at least one pixel, and the first depth value is corresponded to the pixel in the ROI. In step S420, a difference between the first depth value and a second depth value corresponding to at least one pixel except the ROI in the image is calculated. Then, in step S430, the second depth value is mapped to a specific effect level of the image effect based on the predefined effect level and the difference. It is understood that, in some embodiments, the difference may be an absolute value. In an example, a specific object located at the center of a scene is selected as an ROI of the image. In the image, a first object, in front of the specific object, having a first absolute difference from depth value to the specific object, and a second object, in rear of the specific object, having a second absolute difference of depth value from the specific object. When the first absolute difference is equaled to the second absolute difference, the first object and the second object in the image may be applied with the image effect in the same effect level.

Figure 5A:
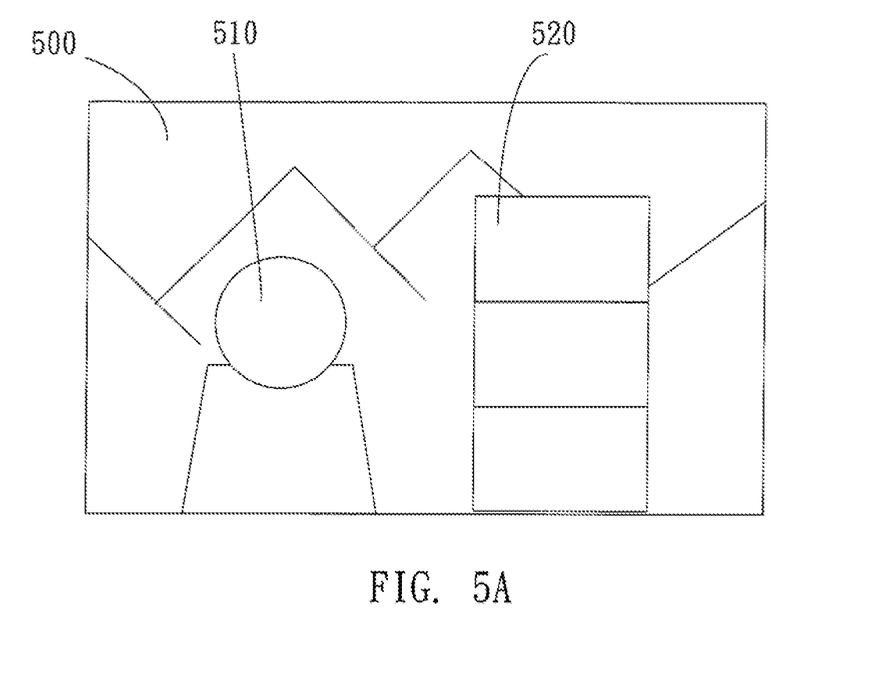
FIG. 5A is an example of an image.
Figure 5B:
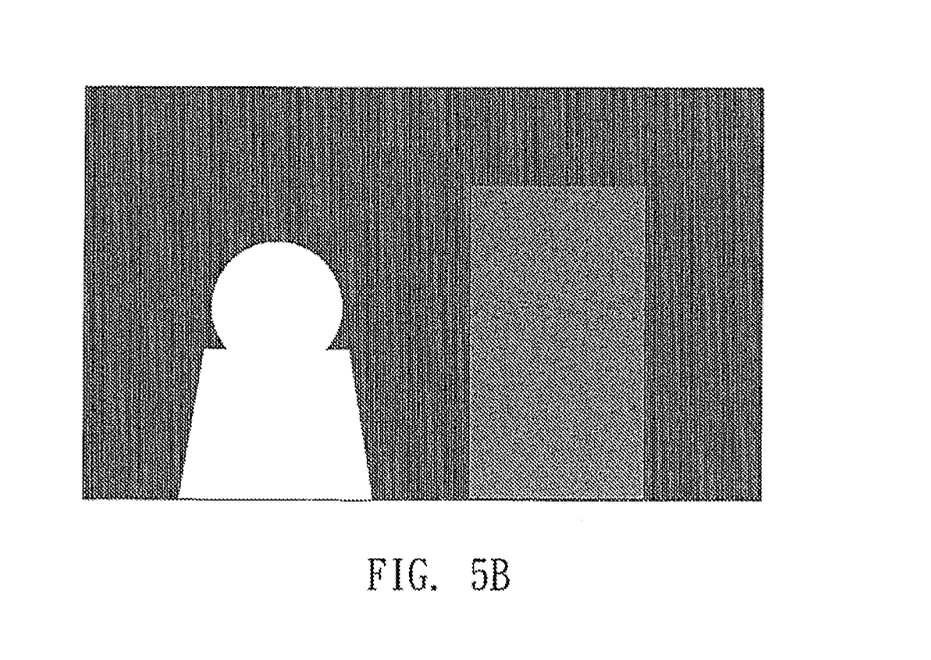
FIG. 5B is a depth map corresponding to the image in FIG. 5A.
Figure 6A:
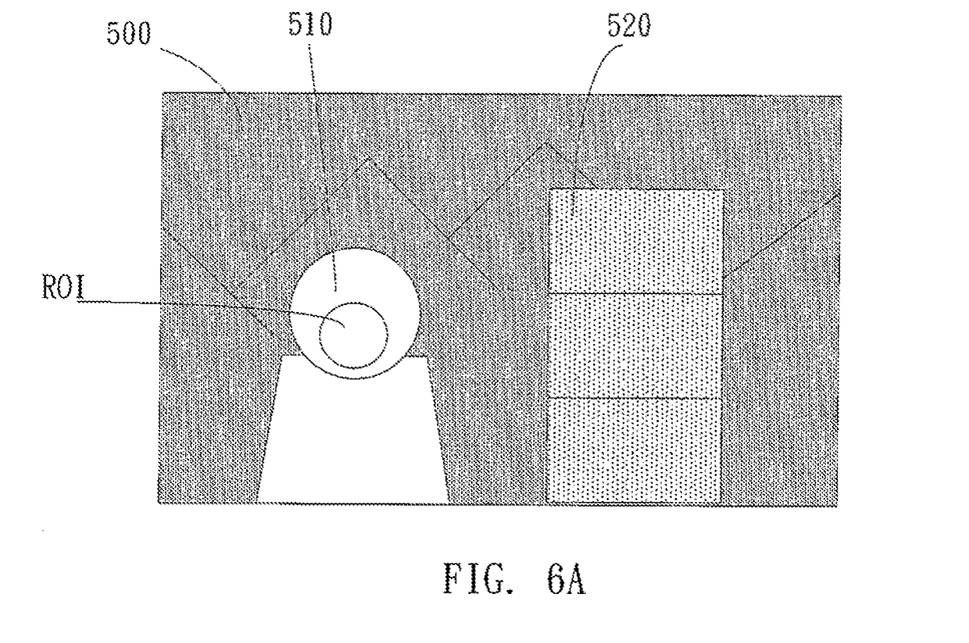
FIGS. 6A and 6B are schematic diagrams illustrating examples of image processing in accordance with depth information of the invention.
Figure 6B:
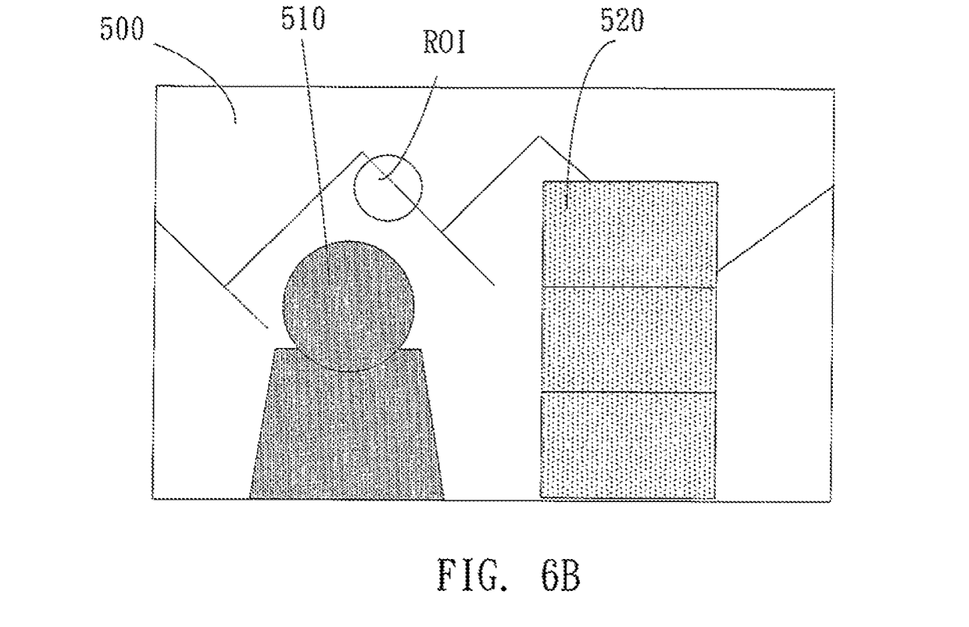

An example of a captured image 500 is shown in FIG. 5A. The image 500 includes a person 510 standing in front of a camera capturing the image 500, and a building 520 and a landscape as the background. FIG. 5B shows a depth map corresponding to the image in FIG. 5A, wherein the depth value is greater if the color is darker. As shown in FIG. 5B, the depth value of the landscape is greater than the depth value of the building 520, and the depth value of the building 520 is greater than the depth value of the person 510. When an image blur effect is used, and the person 510 in the image 500 is selected as an ROI, the person 510 will be clear, effect level (blur level) which closes to the person 510 (ROI) is clearer than elsewhere, and the landscape background is blurred, as shown in FIG. 6A. When the landscape background in the image 500 is selected as an ROI, the landscape background will be clear, effect level (blur level) which closes to the landscape background is clearer than elsewhere, and the person 510 is blurred, as shown in FIG. 6B. It is noted that, in FIGS. 6A and 6B, the density of dots represents the blur level, wherein the blur level is high (blur) when the density of dots is high, and the blur level is low (clear) when the density of dots is low. It is understood that, in some embodiments, several image effects can be simultaneously applied to the image in various effect level based the corresponding depth information.

Therefore, the image processing methods and systems in accordance with depth information can apply at least one image effect to an image with depth information in various image levels. Users can select an ROI in the image thus to define an expect effect level for the selected ROI, and the effect levels for other regions/pixels in the image can be automatically determined based on the depth information, thus increasing operational convenience.

Image processing methods in accordance with depth information, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing, the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. An image processing method in accordance with depth information for use in an electronic device, comprising:
    obtaining at least one image with depth information;
    displaying the image on a display unit of the electronic device;
    receiving a selection of an ROI (Region Of Interest) in the image via a user interface;
    obtaining a first depth value corresponding to the selected ROI from the depth information;

obtaining a second depth value corresponding to at least one pixel except the selected ROI in the image, wherein the second depth value and the first depth value are different; and mapping the first depth value to a first effect level of an image effect, wherein the image effect has a plurality of effect levels;

mapping the second depth value to a second effect level of the image effect, wherein the second effect level and the first effect level are different; and applying the image effect to the image according to the depth information of the image, wherein the selected ROI is applied with the mage effect in the first effect level, the at least one pixel except the selected ROI in the image is applied with the image effect in the second effect level.

2. The method of claim 1, wherein the at least one image comprises a left image and a right image, and the depth information is calculated according to the left image and the right image.

3. The method of claim 2, wherein the left image and the right image are captured via a dual-camera.

4. The method of claim 1, wherein the display unit comprises a touch-sensitive display unit, the user interface is displayed on the touch-sensitive display unit, and the selection of the ROI is received via the touch-sensitive display unit.

5. The method of claim 1, further comprising:
calculating a difference between the first depth value and the second depth value; and
mapping the second depth value to the second effect level of the image effect based on the first effect level and the difference.

6. The method of claim 1, wherein the image effect comprises an image blur effect, and the selected ROI applied with the first effect level of the image is clear than the pixel applied with the second effect level of the image.

7. The method claim 1, wherein the image effect comprises an image gray effect, and the selected ROI applied with the first effect level of the image is gray than the pixel applied with the second effect level of the image.

8. An image processing system in accordance with depth information for use in an electronic device, comprising:
a storage unit comprising at least one image with depth information;
a display unit; and
a processing unit obtaining the image with depth information, displaying the image via the display unit, receiving a selection of an ROI (Region Of Interest) in the image via a user interface, obtaining a first depth value corresponding to the selected ROI from the depth information, obtaining a second depth value corresponding to at least one pixel except the selected ROI in the image from the depth information, mapping the first depth value to a first effect level of an image effect, mapping the second depth value to a second effect level of the image effect, wherein the image effect has a plurality of effect levels, and applying the image effect to the image according to the depth information of the image, wherein the selected ROI is applied with the image effect in the first effect level, the second depth value and the first depth value are different, the second effect level and the first effect level are different, and the at least one pixel except the selected ROI in the image is applied with the image effect in the second effect level when the image effect is applied to the image.

9. The system of claim 8, wherein the at least one image comprises a left image and a right image, and the processing unit calculates the depth information according to the left image and the right image.

10. The system of claim 9, further comprising a dual-camera, and the left image and the right image are captured via the dual-camera.

11. The system of claim 8, wherein the display unit comprises a touch-sensitive display unit, the user interface is displayed on the touch-sensitive display unit, and the selection of the ROI is received via the touch-sensitive display unit.

12. The system of claim 8, wherein the processing unit further calculates a difference between the first depth value and the second depth value, and maps the second depth value to the second effect level of the image effect based on the first effect level and the difference.

13. The system of claim 8, wherein the image effect comprises an image blur effect, and the selected ROI applied with the first effect level of the image is clear than the pixel applied with the second effect level of the image.

14. The system of claim 8, wherein the image effect comprises an image gray effect, and the selected ROI applied with the first effect level of the image is gray than the pixel applied with the second effect level of the image.

15. A non-transitory machine-readable storage medium comprising a computer program, which, when executed, causes a device to perform an image processing method in accordance with depth information, wherein the method comprises:
obtaining at least one image with depth information;
displaying the image on a display unit of the electronic device;
receiving a selection of an ROI (Region Of Interest) in the image via a user interface;
obtaining a first depth value corresponding to the selected ROI from the depth information;
obtaining a second depth value corresponding to at least one pixel except the selected ROI in the image, wherein the second depth value and the first depth value are different;
mapping the first depth value to a first effect level of an image effect, wherein the image effect has a plurality of effect levels;
mapping the second depth value to a second effect level of the image effect, wherein the second effect level and the first effect level are different; and
applying the image effect to the image according to the depth information of the image, wherein the selected ROI is applied with the image effect in the first effect level, the at least one pixel except the selected ROI in the image is applied with the image effect in the second effect level.

* * * * *